Patented Aug. 25, 1953

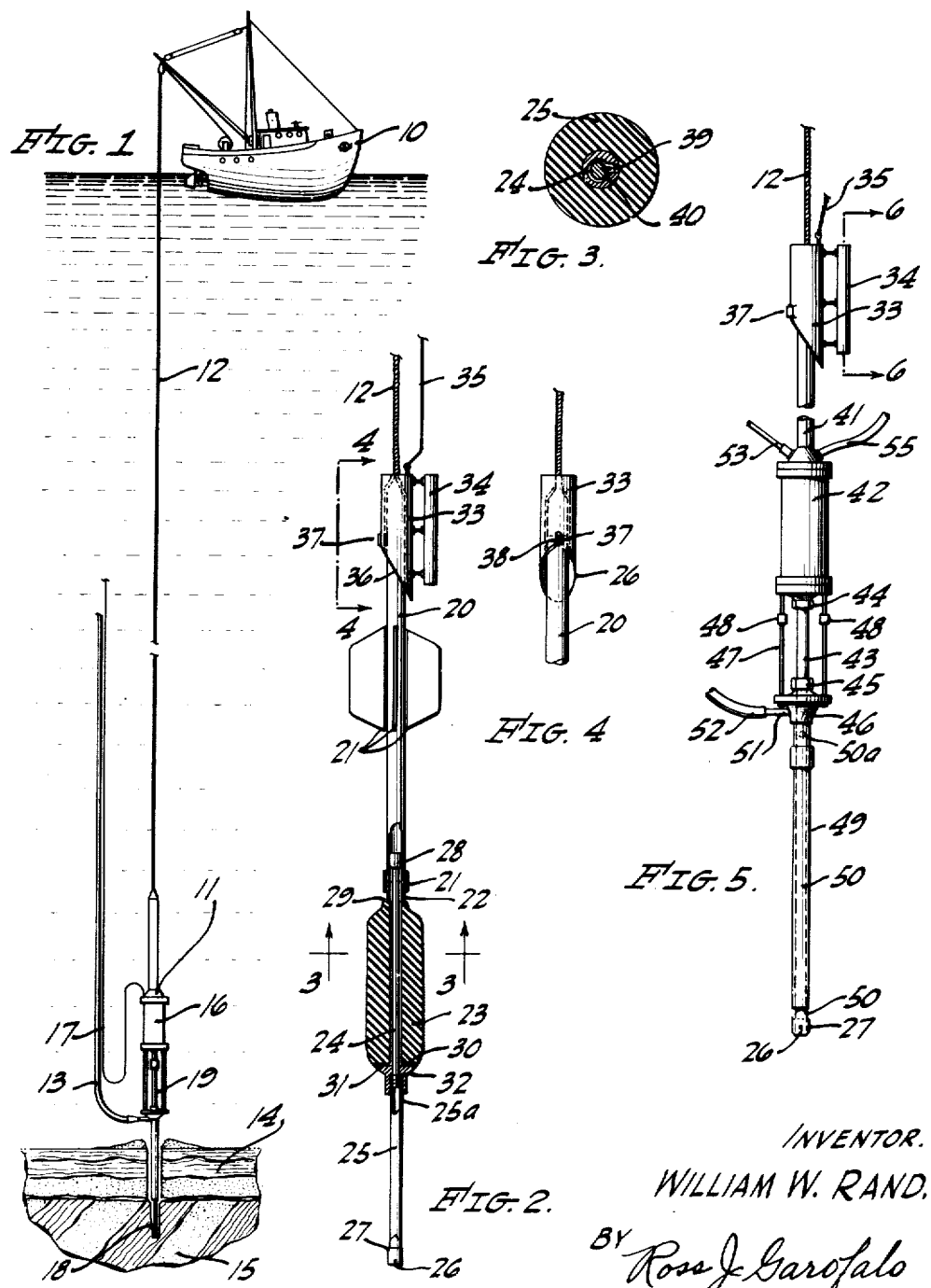

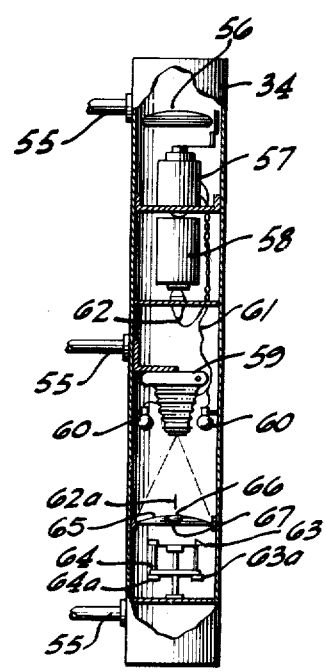

2,650,068

UNITED STATES PATENT OFFICE 2,650,068

CORING METHOD AND APPARATUS

William W. Rand, Santa Barbara, Calif., assignor to Union Oil Company of California, Los Angeles, Calif., a corporation of California Application January 31, 1949, Serial No. 73,776

16 Claims. (Cl. 255—1.4)

This invention relates to a method and apparatus for obtaining core samples such as those utilized in prospecting for valuable subsurface deposits of ore, oil, gas, sulfur, and the like, and is particularly directed to a method and apparatus for obtaining such samples from earth formations lying below bodies of water.

The taking of samples of earth formations and subsequent analysis of such samples permits the determination of the nature, the extent and the constitution of a particular region of the earth's crust and are of material assistance in locating valuable bodies of mineral matter or other materials located therein. Deposits of oil and gas are often found to exist in certain regions in which the geologic formations of the earth's crust usually have particularly characteristic properties. In the search for crude petroleum, subsurface formations having these known properties are located and the determination of whether or not they contain crude petroleum is made by drilling a test well. One particularly characteristic formation in which crude petroleum frequently occurs is one known as an anticline in which the sedimentary bedding planes rise to a maximum level and then fall. Should such an anticline be covered by an impervious layer of material such as hard rock, accumulations of petroleum, and other similar materials are frequently found within such a geologic structure. By obtaining core samples of sedimentary or other types of formations and measuring of the inclination of the bedding planes, the presence or absence of an anticline type of structure may be determined.

The device and the method of the present invention are such as to permit the taking of core samples from beneath a body of water such as lakes or on the continental shelves existing beneath and beyond the tidelands. The core samples obtained are such as to directly indicate the inclination and the azimuth of the inclination, known geologically as the dip and strike, of the bedding planes. The nature and type of submarine formations may thus be determined and from the analysis of a considerable number of such samples the likely presence or probable absence of petroliferous accumulations may be established.

It is therefore a primary object of this invention to provide a method whereby samples of submarine rock and similar formations may be obtained.

A further object of this invention is to provide a method whereby the core sample is separated from the submarine formation by the percussion rather than rotating action of the coring tool without damage to inclination and azimuth recording instruments.

An additional object of this invention is to provide a method in which the core sampling device employed to take the sample is operated in conjunction with a recorder device which measures the inclination and azimuth of the inclination of the core sampling tube after it has penetrated into the formation and before the core is removed therefrom.

Another object of this invention is to provide an improved percussion device for obtaining submarine core samples from earth formations.

Additional objects and advantages of this invention will become apparent to those skilled in the art as the description thereof proceeds.

Briefly, the present invention comprises a method for the taking of submarine core samples from formations existing below bodies of water and whereby these core samples are taken in such a manner that the inclination and azimuth of the inclination of the coring device is recorded to permit the direct determination of the dip and strike of the bedding planes of the sample obtained. The submarine coring device is suspended from a surface vessel at a point above the region of the formation from which a sample is desired. The sampling device comprises a hollow core sampling barrel or tube which is percussively driven into the submarine formation thereby enclosing a sample or core within the tube. No rotary action of the core sampling tube is employed and the tube is forced into the formation solely by percussive forces. Prior to the removal of the core sample tube from the formation, the inclination of the tube and its azimuth are recorded. The core sample obtained is also scored or marked in order to fix its position with respect to that of the sampling tube. Subsequent analysis of the bed planes exposed in the core sample, upon consideration of the inclination of the instrument and the relative position of the core with respect to the sampling tube, permits the direct determination of the dip and strike of the submarine formations penetrated.

Two principal modifications of the device comprise the preferred forms thereof; one in which the device is weighted so that the core sampling tube is driven by a single percussive impact obtained by dropping the device into the formation to be sampled, and the second in which the core sampling tube is directly connected with a percussive driving means such as an air or electrically operated hammer, and in which a series of percussive impacts drive the core sample tube into the formation. In both modifications, the means which are employed to determine the inclination and the azimuth of the core sampling tube after it has been driven into the formation, may or may not be completely separate from the main core sampling device. After the core sampling tube has penetrated the formation to be sampled and the core is ready to be removed from the formation, the recording mechanism makes a photographic record of the amount and azimuth of the inclination of the sampling tube as well as the azimuth of a reference point in the recorder having a known relation to a scribe mark made on the core sample during penetration. When this record has been established, the core sampling device and the core sample are pulled free of the submarine formation by the suspension line and hauled to the surface where the photographic record and the core are recovered.

The method of operation and specific details of the present invention may be more easily understood by reference to the accompanying drawings in which:

Figure 1 shows the air or electrically operated modification of the percussion core sampling device suspended from a surface vessel in position after a core sample has been taken, Figure 2 is a vertical semisectional drawing of the weighted coring device modification with the overshot assembly in position for obtaining a photographic record, Figure 3 shows a cross section view of the device of Figure 2, Figure 4 shows a vertical elevation view of the overshot assembly taken at right angles to that shown in Figure 2, Figure 5 shows a vertical elevation view of the air or electrically operated coring device with the overshot assembly in position, Figure 6 shows a schematic cross sectional elevation view of a portion of the overshot assembly containing the recording equipment, Figure 7 shows an elevation view of another modification of the device, and Figure 8 shows a detail drawing of the coring head.

Referring now to Figure 1, a surface vessel 10 is shown from which submarine coring device 11 is suspended by means of cable 12. Connection 13 is made by means of which a sufficient quantity of submarine overburden 14 is hydraulically removed from formation 15 from which it is desired to obtain a core sample as hereinafter more fully described in conjunction with Figure 5. Water is pumped by means of a pump aboard vessel 10 through connection 13 in order to accomplish the overburden removal, thereby exposing the upper surface of submarine formation 15. Subsequently percussion means 16 is actuated via connection 17 from a power source aboard vessel 10 and which percussively drives core sampling tube 18 via jar rod 19 into submarine formation 15 thereby enclosing a core sample thereof within tube 18. Once the sampling tube is driven a sufficient distance into formation 15 to obtain the desired sample, the inclination and azimuth of the device is recorded by a recorder attached to the overshot assembly, and the combined device is hauled to the surface via suspension cable 12. The core sample is removed from the core barrel 18 and the photo- graphic record of the inclination is removed from the overshot assembly briefly described above.

In the obtaining of core samples by employing the weighted modification of this device, suspension cable 12 lowers the device to a distance above the bottom from which the sample is to be obtained and upon release of the suspension the device is allowed to fall to and to penetrate the submarine formation thereby filling the core sampling barrel with a sample of the submarine formation. While the device is in a position assumed on penetration of the formation, the overshot assembly is lowered to engage the coring device and a record is made of the inclination and azimuth of the inclination of the device. The device and the recovered core sample are subsequently brought to the surface and the sample and the record removed from the coring device.

The construction of the weighted modification is more clearly shown in Figure 2 in which suspension cable 12 is directly attached to upper sampling tube 20 which is provided with radial fins 21 by means of which the gravitational descent of the device is guided. Upper sampling tube 20 is attached by means of collar 21 to lower sampling tube 22 upon which weight 23 is supported. Extending through weight 23 and lower sampling tube 22 is jar rod 24 which is slidably mounted therein and to which is integrally attached core barrel 25 at the lower end of the device. Aperture 25a is provided to allow the escape of water from barrel 25 displaced by the core sample. Rotary motion of jar rod 24 relative to lower sampling tube 22 is prevented by means of a keyway 39 and key 40 or a spline shown in Figure 3. Core barrel 25 is further provided at its lowest extremity with coring head or cutting bit 27 which in turn is provided with scribe 26 which serves to mark the core as the core barrel penetrates the formation. Jar rod 24 is provided with collar 28 by means of which jar rod 24 and core barrel 25 are suspended from shoulder 29 when the device is suspended above the surface of the water body. When it is thus suspended there is a space between the lower surface 30 of weight 23 and upper surface 31 of flange 32. As the device descends upon release of the suspension, core head 26 contacts the surface of the formation to be sampled while weight 23 and upper and lower sampling tubes 20 and 22 continue to descend about jar rod 24 until contact is made between surfaces 30 and 31. The impact or precussion resulting drives core barrel 25 into the submarine formation a distance which is largely determined by the mass of weight 23 and the distance above the bottom at which the suspension was released.

The core sample following the impact is enclosed within core barrel 25 and the entire device extends upwardly into the body of water from the submarine formation at a certain angle of inclination usually less than 5°. Overshot assembly 33 to which recorder case 34 is integrally attached is lowered to engage upper sampling tube 20 and to assume a predetermined orientation with respect thereto. Overshot assembly 33 is hinged to permit being closed around suspension line 12 and is lowered by means of suspension line 35. The assembly comprises a hinged cylindrical section cut off at an angle to its longitudinal axis exposing elliptical surface 36. Positioning lug 37 is integrally attached to upper sampling tube 20 and as the overshot assembly slides down around the upper end of upper sampling tube 20, overshot assembly turns so that lug 37 is engaged by slot 38 as shown in Figure 4. The position of overshot assembly 33 with respect to the sampling device penetrating a submarine formation is thereby always maintained at a known orientation which is predetermined by positioning lug 37 and slot 38. By these means recorder case 34 assumes the same angle of inclination and orientation as the core sampling device since no rotary motion between the upper, lower and core receiving tubes is permitted. A photographic record therefore of the inclination and azimuth of recorder 34 directly determines the strike and dip of the core sample recovered from the formation. The recorder case 34 is then hauled to the surface and the coring device and core sample is pulled free from the formation. Weight 23 may be raised to cause a series of impacts between collar 28 and shoulder 29 to facilitate removal of the device from the formation.

This modification was weighted with lead weights 23 to give a total of 750 pounds and had a 2 inch core sampling tube. Good samples were obtained by dropping the device from 10 to 20 feet. Plunges from as high as 70 feet did not damage the equipment. Samples of hard shales (Monterey) 3 feet long and even samples in granite (3 inches long) were obtained satisfactorily. Core samples have also been taken from the ocean bottom in formations of sandstone and volcanic agglomerate through as much as 5 feet of overburden.

Referring now to Figure 5, a second modification of the core sampling device of the present invention is shown in more detail and which is suspended by cable 12 from a surface vessel and provided with recorder housing 34 supported on overshot assembly 33, substantially the same mechanism as was described in connection with Figures 2 and 3. This modification of the device consists of upper tube 41 to which cable 12 is attached and with the upper end of which overshot assembly 33 engages. Upper tube 41 is integrally attached to percussion assembly housing 42 within which is supported a hydraulically, electrically or pneumatically operated percussive means which may be an electric or an air hammer of the well known type. Driving tube 43 extends from within hammer case assembly 42 through stuffing box 44 which provides a fluid tight seal to prevent entry of water into case 42. Driving tube 43 also extends through stuffing box 45 and through flushing head 46. Flushing head 46 is slidably mounted upon jar rods 47 which are provided with stops 48 and by means of which flushing head 46 and flushing tube 49 may move longitudinally with respect to driving tube 43 and coring tube 50 attached thereto. Aperture 50a permits escape of water displaced from barrel 50 by the core sample. Flushing inlet 51 is provided and flushing fluid hose 52 is connected therewith to introduce a fluid such as sea water or fresh water from the surface of the water body through flushing head 46 into the annular space between flushing tube 49 and sampling tube 50. As explained in connection with Figure 1 the purpose of this flushing fluid is to hydraulically wash away the submarine overburden comprising silt, soft sand, and the like, from the surface of the submarine formation from which the sample is desired. Sampling tube 50 is provided with core cutting head or bit 27 and scribe 26, the same as in Figure 2. As the bit is percussively forced by the action of the hammer or percussive means within assembly case 42 into the formation, flushing tube 49 and flushing head 46 rest on the formation being penetrated and sampling tube 50, driving tube 43, jar rods 47, and hammer case 42 move downwardly with respect thereto. The power required to cause the percussive means to operate, electric energy or air or other gas under pressure, is supplied by means of connection 53 from the surface.

When the core sampling tube 50 has penetrated the desired depth in the formation, actuation of the percussion means in case 42 is stopped and overshot assembly 33 is passed down suspension cable 12 to engage the upper portion of upper sampling tube 41 in the manner described above. After the predetermined time interval has elapsed and the overshot assembly is in the position shown in Figure 5, a preset photographic exposure records the inclination and the azimuth of the inclination of the device as it rests prior to removing the device and the core sample from the formation. The device and the sample are then subsequently pulled free of the formation, aided if necessary by vibration generated by the percussion means, and hauled to the surface.

In the case of electrically operated percussion means, connection 53 may comprise an insulated water-proof electric cable by means of which electric energy is conveyed to the percussion means. Where pneumatically or hydraulically operated devices are employed, connection 53 comprises a high pressure hose for the introduction of high pressure gases such as air or fluids such as water into case 42. In the pneumatic hammer it is highly desirable that a connection 54 be also provided to remove low pressure exhaust gas from case 42 and convey it to the surface so that the device may discharge air at as low a pressure as possible. Hydraulic drives may discharge fluid such as sea water directly into the water body via a connection 54 or if other fluids are used these may be recycled to the surface vessel. The pneumatic devices are operable where this discharge takes place directly from case 42 into the body of water at that level; however, higher input gas pressures are required and the efficiency with which compressed gas energy is utilized is lower than if the exhaust gas is discharged at the surface into the atmosphere.

The electrically driven percussion means are preferred over the others named since no discharge occurs and they are easily controlled. One type of electric percussion means comprises an electric motor of the universal type operating on A. C. or D. C. voltage and provided with a splined shaft. To this shaft is attached a driving bevel gear which engages a pair of opposing driven bevel gears at right angles. An idler gear engaging the driven bevel gears is provided opposite the driving gear and to it is attached a percussion shaft. The driven gears are weighted eccentrically so that operating the electric motor rotates them and vibrates the percussion shaft.

Referring now to Figure 6, a schematic cross sectional elevation view of instrument housing 34 shown in Figures 2 and 5 is shown. Housing 34 is provided with supports 55 by means of which it is integrally connected to overshot assembly 33. Within housing 34 is situated timing mechanism 56, electric switch 57, power supply means 58 which is conveniently an electric dry cell, camera recorder 59, electric lights 60 which are connected via electrical connections 61 and 62 in parallel with switch 57 and power supply means 58, and chamber 63 provided with magnetic compass means 64, compensating magnets 63a and 64a, scribe mark 62a, and convex surface 65 which is translucent and provided on its upper surface with a series of inscribed circles which are concentric about center point 66. When the overshot assembly is in position for recording, scribe mark 62a is in a fixed known relationship with respect to scribe 26 on bit 27 so that a photographic record of the geographic orientation of scribe 26 is obtained. Chamber 63 is filled with a fluid leaving bubble 67 which rises to the highest point below convex surface 65 and indicates by its relation to the inscribed circles mentioned above the inclination of the instrument. A small float such as a hollow sphere weighing less than its displaced volume of the fluid may be used instead of a bubble and is preferable since it photographs better. Camera 59 photographically records at a predetermined time the position of bubble or float 67, the direction indicated by magnetic compass means 64, and the position relative to the compass of scribe mark 62a thereby recording the inclination and the azimuth of the inclination of the core sample taken from a submarine formation.

Instrument casing 34 is preferably fabricated of brass or other nonmagnetic material to permit the employment of a magnetic compass for direction indication without necessity of highly compensating the compass.

The recording mechanism contained in recorder case 34 may be carefully made and assembled so that it is unaffected by the percussive forces employed to penetrate the formation and will accurately record the geographic orientation of the scribe mark, the inclination of the core barrel, and the magnetic direction. With such a recording instrument, modifications of the submarine core sampling device of this invention may be made in which less time is consumed per core sample taken since the recorder need not be lowered to the sampling device after penetration is achieved.

Such a recording device as that described in Figure 6 may be incorporated in the sampling device of Figure 2 and so arranged that the time delay mechanism for exposing the photographic film is started with the impact and the exposure takes place about 30 seconds later for example. An inertia operated lever actuating the starting pin of a stop watch set to close switch 57 after a preset time is suitable. In this modification, overshot assembly 33 shown in Figure 2 is eliminated and recorder case 34 may be suspended in shock proof mountings within upper sampling tube 20 and aligned with respect to scribe 26. The device is provided with fluid proof couplings for recovery of exposed film and insertion of new film. Thus the time necessary for lowering the overshot assembly to the device after formation penetration is saved.

Such a shock proof recording mechanism may be incorporated in the sampling device shown in Figure 5 where a power device percussion means is used to drive the sampling barrel 50 and coring bit 27 into the formation. In this modification the recording device is preferably operated from the surface whereby the lights for exposing the photographic record are lighted manually from the surface after the core barrel has penetrated the desired distance into the formation. In this instance an inertia-actuated time delay mechanism is not employed. Overshot assembly 33 is not used and recorder case 34 incorporated in a shock resistance mounting within upper sampling tube 41 shown in Figure 5.

In order to render the recorder mechanism of Figure 6 shock resistant, timer 56 is mounted in sponge rubber or other shock absorbing material. The moment of inertia of all components is decreased to the lowest value by securing them rigidly on short mountings and making them as light in weight as possible. Compass means 64 is mounted on a bearing so that it is free to rotate but not become unmounted from the support. The entire recorder case 34 is then inserted inside the sampling tube on springs or sponge rubber and fixed so that longitudinal motion only and no rotary movement relative to the upper sampling tube is permitted. The relationship between the recorder and scribe 26 is thus maintained.

Such a shock resistant recorder may be added to the core samples of Figures 1 and 5 and may be set off by a preset time delay mechanism.

Referring to Figure 7, this modification of the core sampling device combines the single impact feature of the device shown in Figure 2 with the flushing tube shown in Figure 5. The device is lowered through the overburden which is hydraulically removed to a position adjacent to the formation to be sampled and the core barrel is dropped from a raised position within the casing. The impact drives the core barrel into the formation in the same way as that described in Figure 2. The present modification comprises outer casing 70 suspended by cable 12 and provided with flushing inlet 71 and connection 72 through which flush fluid is passed to remove silt and overburden from the formation. Suspended within casing 70 is upper core sampling tube 73 provided with guides 74, 75 and 76 by means of which smooth longitudinal motion of tube 73 relative to casing 70 is permitted. Core barrel 25 provided with core head 27 is attached to sampling tube 73 by means of connection 77. Aperture 25a is provided whereby fluids displaced from core barrel 25 by the core sample during penetration may escape. The lower end of sampling tube 73 is provided with collar 78 to which is attached retainer spring 79. Spring 79 is sized to allow free passage therethrough of core barrel 25 and to engage connection 77. Loss of sampling tube and core barrel from the bottom of casing 70 is hereby prevented. Sampling tube 73 is weighted with weights in chamber 80 and the recording instruments may be placed in chamber 81a and oriented with respect to the scribe in a known way. The recording instruments may be incorporated in the overshot assembly as described above if desired but in such a modification sampling tube 73 must be prevented from turning with respect to casing 70 by means of a keyway and key or spline or other means.

Sampling tube 73 is held in a raised position within casing 70 by means of lock 81. Collar 82 within tube 73 is engaged by jaws 83 and is held in engagement by means of plunger 84 under compression of spring 85. By means of line 86 extending to the surface, plunger 84 is raised when the sample is to be taken and sample tube 73 and core barrel 25 fall and penetrate the formation.

Here the inertia actuated time delay recording device described above may be used since one impact only is used in the penetration of the formation once it has been reached after jet action to remove overburden. The recording mechanism proper is so constructed to resist the impact of the falling core barrel.

In Figure 8 is shown a cross section of the lower part of the core barrel 25 and the coring head or bit 27. It has been found that the core barrel should preferably be fabricated of chrome-molybdenum alloy steel to resist the impact and that the most satisfactory core heads have been turned on a lathe from chrome-molybdenum alloy steel and subsequently case hardened according to well known methods.

In a series of experimental core heads and the testing of these in actual submarine coring operations, the bevel of the lowermost tip of the head is of considerable importance in satisfactorily penetrating the formation without damaging either the core head or the sampling barrel. With a bevel having angle $\theta$ equal to 60°, core heads capable of coring short distances into granite have been found. Angles between about 20° and 70° are suitable while other bevels give core heads which fail on impact prevent the recovery of a satisfactory core. Angle $\theta$ is preferably low for hard formations and high for soft formations.

The screw attaching head 27 to tube 25 is provided with a hardened conical point adapted to score the core as it enters.

A satisfactory core head used in successfully obtaining a large number of samples was used with a 2.0 inch core sampling tube and was 2.125" outside diameter 90, length 91 was 1.750", inside head diameter 92 was 1.625", and inset distance 93 was 1.0". Angle $\theta$ was 60° and distance $d$ was about 0.0625 inch.

One of the prime advantages of the present invention in the taking of submarine core samples is the elimination of the services of a diver usually required in such submarine sampling operations. The device of the present invention permits the taking of cores from submarine formations efficiently and simply and provides good samples and accurate data by means of which conditions and geologic properties of submarine formations may be readily ascertained.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. An apparatus for obtaining samples of submarine formations which comprises a hollow core barrel with a core head attached to the lower end, a movable massive weight adapted to apply sharp impact force to said core barrel, said weight acting longitudinally with respect to said core barrel, a sampling tube, suspension means for said apparatus, and means for recording the inclination and azimuth of inclination of said core barrel after penetration of said formations.

2. An apparatus for obtaining samples of submarine formations which comprises a hollow core barrel, a jar rod attached to said core barrel and extending through a lower sampling tube, a massive weight concentrically attached to said lower sampling tube, an upper sampling tube attached to said lower sampling tube, radial guide fins attached to said upper sampling tube, a suspension line attached to the upper extremity of said upper sampling tube for suspending the entire device from the surface of a body of water, an overshot assembly containing means for recording the inclination and azimuth of inclination of said device, said device being allowed to fall by gravity from a point above said subsurface formations and to penetrate the same.

3. An apparatus for obtaining core samples from submarine formations which comprises a hollow sampling tube, releasable suspension means therefor, a streamlined massive weight concentrically attached to sampling tube, a jar rod extending through said sampling tube and slidable therethrough, a core receiving barrel attached to said jar rod, said apparatus being adapted to a free fall by gravity from a point above the submarine formation to be sampled.

4. An apparatus for obtaining core samples of submarine formations which comprises a hollow core receiving barrel, a jar rod attached coaxially to said core barrel, a sampling tube surrounding said jar rod, a massive weight supported on said sampling tube, suspension means integrally attached to said sampling tube, said jar rod being reciprocable within said sampling tube between fixed limits, said jar rod being longer than said sampling tube whereby upon release of said suspension means a free fall of said apparatus results by gravity bringing said core barrel into contact with the formation to be sampled and said massive weight subsequently applies a sharp impact to said core barrel driving it into the contacted formation thereby taking a core sample therefrom.

5. An apparatus for obtaining core samples from submarine formations which comprises a hollow sampling tube, a suspension line attached thereto, a massive weight attached to said sampling tube, a jar rod extending through said sampling tube, said jar rod and sampling tube being provided with a key and keyway to allow reciprocation of said sampling tube and weight with respect to said jar rod and to prevent relative rotary movement therebetween, a core receiving barrel attached to said jar rod, said apparatus being adapted to a free fall by gravity to bring said core into contact with the formation to be sampled whereby said massive weight descends around said jar rod and applies a sharp impact to said core barrel driving it into said formation and cutting a core sample therefrom.

6. An apparatus according to claim 5 wherein said jar rod is provided at its upper end with a collar, a shoulder provided at the upper end of said sampling tube and adapted to engage said collar to support said jar rod and core barrel therefrom, said jar rod extending through said sampling tube to a point beyond the other end of said weight, and an impact flange provided adjacent the point of attachment of said jar rod and said core barrel and adapted to receive the impact of said weight.

7. An apparatus according to claim 5 in combination with a case hardened core cutting head attached to the lower end of said core barrel by means of a screw having a conical pointed inner end adapted to scribe the core as it passes into the core receiving barrel.

8. An apparatus according to claim 7 wherein said core cutting head is essentially cylindrical and provided with a bevelled cutting edge at its lower end, said bevel making an angle of from 20° to 70° with the plane of the cutting edge.

9. An apparatus according to claim 5 in combination with an upper sampling tube disposed between said suspension line and said sampling tube, means uspported within said upper sampling tube adapted to record the inclination of the device, the azimuth of the inclination and the azimuth of a scribe mark on the core sample, said means being mounted therein in a shock-proof mounting.

10. An apparatus for the taking of core samples from submarine formations which comprises a hollow core barrel, a jar rod attached to said core barrel and extending through a lower sampling tube, a massive weight concentrically attached to said lower sampling tube, an upper sampling tube attached to said lower sampling tube, radial guide fins attached to the upper sampling tube, a suspension line for suspending the entire device from the surface of a body of water, means for recording the inclination and azimuth of the inclination of the apparatus, said apparatus being allowed to fall by gravity from a suspension point above said submarine formation and to penetrate the same.

11. An apparatus for obtaining samples of submarine formations which comprise a hollow core receiving barrel, a jar rod attached coaxially to the upper end of said core barrel, a sampling tube surrounding said jar rod, a massive weight supported on said sampling tube, suspension means for suspending said apparatus from the surface of a body of water, said jar rod provided at its upper end with a collar, said sampling tube being provided with a shoulder at its upper end to engage said collar and support said jar rod and core barrel therefrom, said jar rod extending downwardly therefrom through said lower sampling tube to a point beyond the lower end of said massive weight to a point of attachment with said core barrel, an impact flange disposed at a point adjacent the upper end of said core barrel and adapted to receive the impact of the lower surface of said massive weight, said apparatus being adapted to a free fall by gravity into contact by said core barrel with the formation to be sampled whereby said massive weight continues its descent after said contact and applies a sharp impact to said impact flange driving said core barrel into said formation and cutting a core sample therefrom.

12. An apparatus according to claim 11 in combination with an overshot assembly, means therein for recording the inclination and azimuth of the inclination of said apparatus, means for lowering said overshot assembly down said suspension means into engagement with said apparatus while said apparatus is penetrated into the formation sampled.

13. An apparatus according to claim 11 in combination with means for recording the inclination and azimuth of the inclination of the apparatus, said means being shock-mounted within said sampling tube in a way adapted to prevent relative rotary motion with respect to said sampling tube.

14. An apparatus according to claim 11 in combination with a plurality of radial guide fins attached the upper end thereof and adapted to guide said apparatus during the free fall in a substantially vertical direction.

15. A method for obtaining core samples of submarine formations which comprises suspending a core receiving barrel and a weight movable with respect thereto from the surface of a body of water above a point from which the sample is desired, releasing the suspension of said core receiving barrel so that it drops by gravity and contacts said formation and is subsequently impacted by said weight thereby driving said core barrel into said formation and taking a core sample therefrom in said core barrel, subsequently combining said core barrel in the penetrated position in said formation with an inclination and azimuth measuring device, recording the inclination and azimuth of said core barrel, and removing said core sampling tube and core sample from the formation.

16. A method for surveying and sampling submarine formations which comprises lowering a core sampling assembly having a core receiving barrel from the surface on a suspension line, generating a percussive force below the surface of the body of water and within the thus suspended assembly by the impact of a movable weight accelerated by the force of gravity against said core receiving barrel, driving said core barrel percussively by means of said force into said formation thereby taking a core sample, subsequently combining said core sampling assembly while penetrating said formation with an inclination and azimuth measuring devices lowered along said suspension line, measuring the inclination and azimuth of the inclination of said tube while penetrating said formation, and removing said core sampling tube and said core sample from said formation.

WILLIAM W. RAND.

References Cited in the file of this patent

UNITED STATES PATENTS

| Number | Name | Date |
|---|---|---|
| 801,072 | Frieh | Oct. 3, 1905 |
| 2,176,477 | Varney et al. | Oct. 17, 1939 |
| 2,197,062 | Sweet et al. | Apr. 16, 1940 |
| 2,252,620 | De Long | Aug. 12, 1941 |
| 2,489,566 | Engle | Nov. 29, 1949 |
| 2,536,303 | Miller | Jan. 2, 1951 |

Certificate of Correction

Patent No. 2,650,068                                  August 25, 1953

WILLIAM W. RAND

It is hereby certified that error appears in the printed specification of the above numbered patent requiring correction as follows:

Column 6, line 42, for "level;" read *level,*; column 7, line 72, for "resistance" read *resistant*; column 10, line 42, after "core" insert *barrel*; line 72, for "uspported" read *supported*; column 11, line 19, for "comprise" read *comprises*; column 12, line 5, before "the" insert *adjacent*; lines 22 and 23, strike out "barrel" and insert instead *sampling tube*; same line 23, strike out "sampling tube" and insert instead *barrel*; line 38, for "devices" read *device*; and that the said Letters Patent should be read as corrected above, so that the same may conform to the record of the case in the Patent Office.

Signed and sealed this 20th day of October, A. D. 1953.

[SEAL]

ARTHUR W. CROCKER,
*Assistant Commissioner of Patents.*